(12) United States Patent
Mulick

(10) Patent No.: US 7,991,567 B1
(45) Date of Patent: Aug. 2, 2011

(54) CENTRALIZED OPERATING METER FOR ENERGY TECHNOLOGIES

(76) Inventor: Ronald Mulick, Thousand Oaks, CA (US)

( * ) Notice: Subject to any disclaimer, the term of this patent is extended or adjusted under 35 U.S.C. 154(b) by 600 days.

(21) Appl. No.: 12/103,520

(22) Filed: Apr. 15, 2008

(51) Int. Cl.
*G01R 21/00* (2006.01)
*G01R 21/06* (2006.01)

(52) U.S. Cl. ............ 702/61; 702/57; 702/58; 702/60; 702/62; 700/22; 700/286; 700/291; 700/295; 700/297; 361/600; 361/601

(58) Field of Classification Search ............ 702/57, 702/58, 60, 61, 62; 700/22, 286, 291, 295, 700/297; 361/600, 601
See application file for complete search history.

(56) References Cited

U.S. PATENT DOCUMENTS

| | | |
|---|---|---|
| D339,077 S | 9/1993 | Chrétien |
| D357,426 S | 4/1995 | Ison |
| 6,227,890 B1 | 5/2001 | Roper, Jr. et al. |
| 6,611,772 B1 | 8/2003 | Lavoie et al. |
| 7,167,804 B2 | 1/2007 | Fridholm et al. |
| 2006/0007016 A1 | 1/2006 | Borkowski et al. |
| 2006/0031180 A1 | 2/2006 | Tamarkin et al. |
| 2008/0278000 A1* | 11/2008 | Capp et al. ............ 307/21 |

* cited by examiner

*Primary Examiner* — Sujoy K Kundu

(57) ABSTRACT

The present invention features an electrical system comprising a centralized operating meter for energy technologies which comprises one or more of the following features: (1) a central processing and internal memory unit (CPIM), wherein the CPIM electronically communicates with a utility meter and a performance meter, wherein the CPIM sends data information to a display unit which separately displays the power usage registered to the utility meter and the performance meter, (2) a utility meter connecting to a breaker box via a set of wires and a performance meter connecting directly to the set of wires that connects the utility meter to the breaker box, and (3) a switch, wherein upon detection of a disruption of power from a grid the COMET immediately opens the switch to disconnect the electrical system from a grid and allow any generated power from a renewable resource electrical system to continue supplying the electricity.

1 Claim, 3 Drawing Sheets

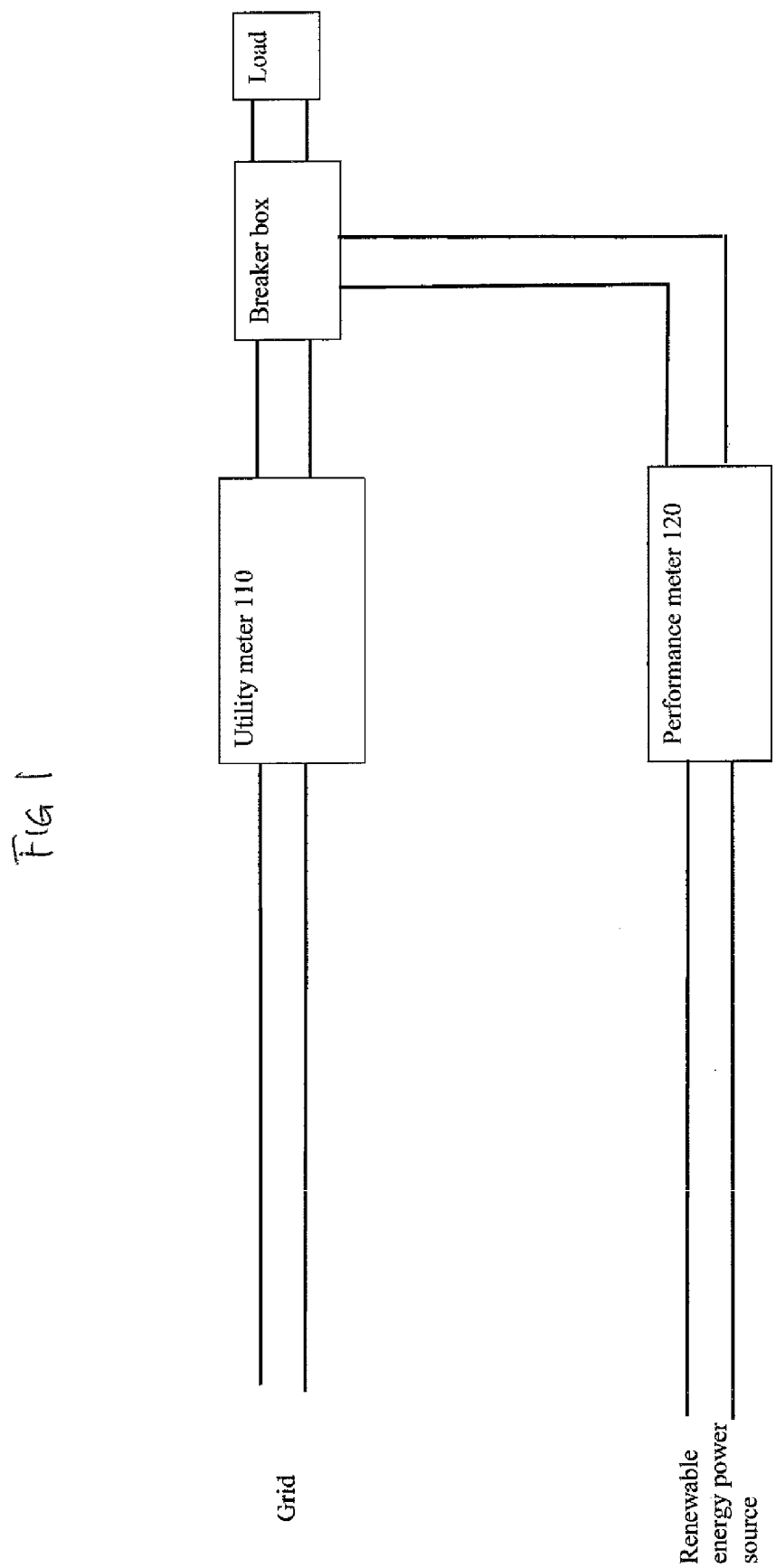

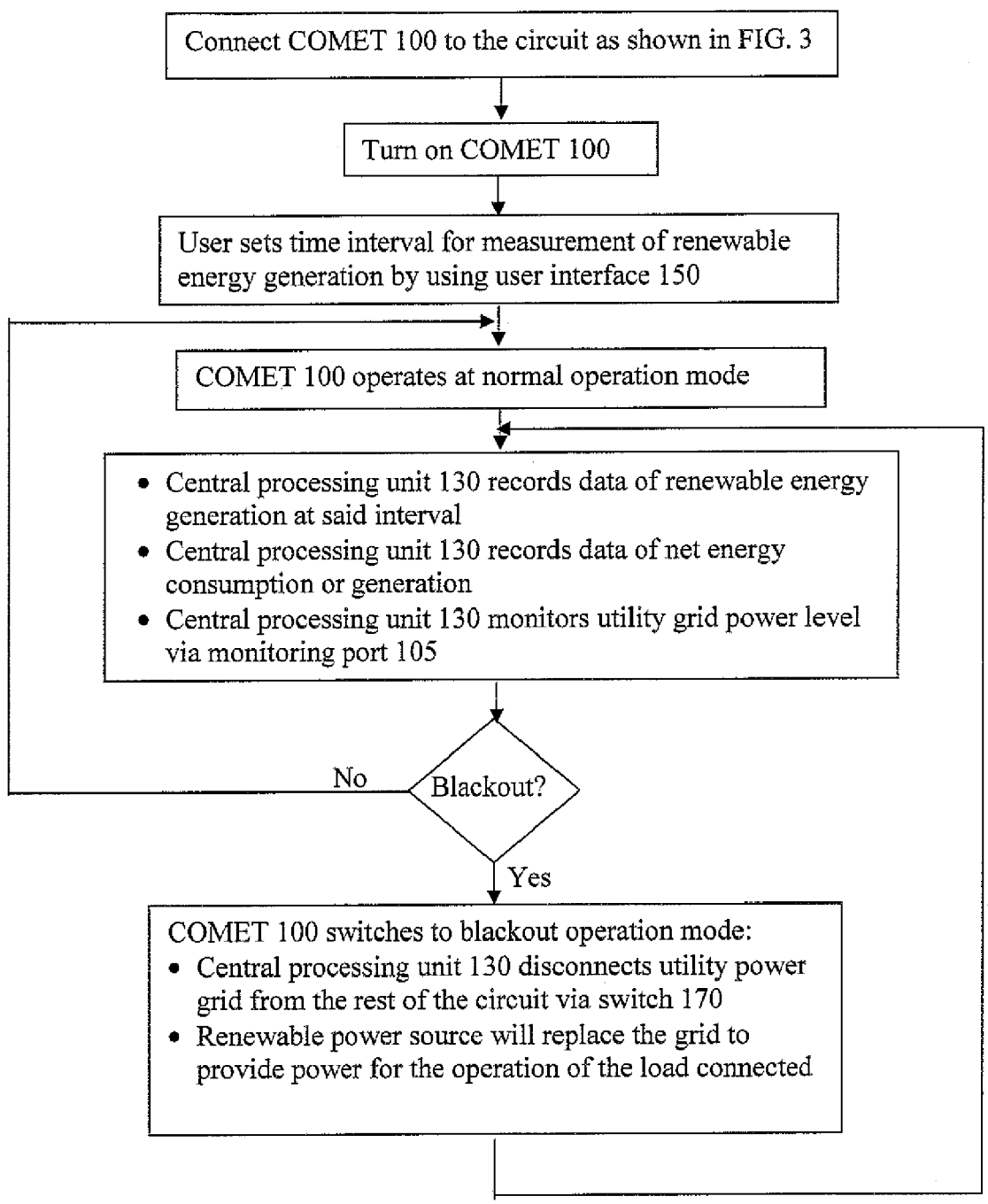

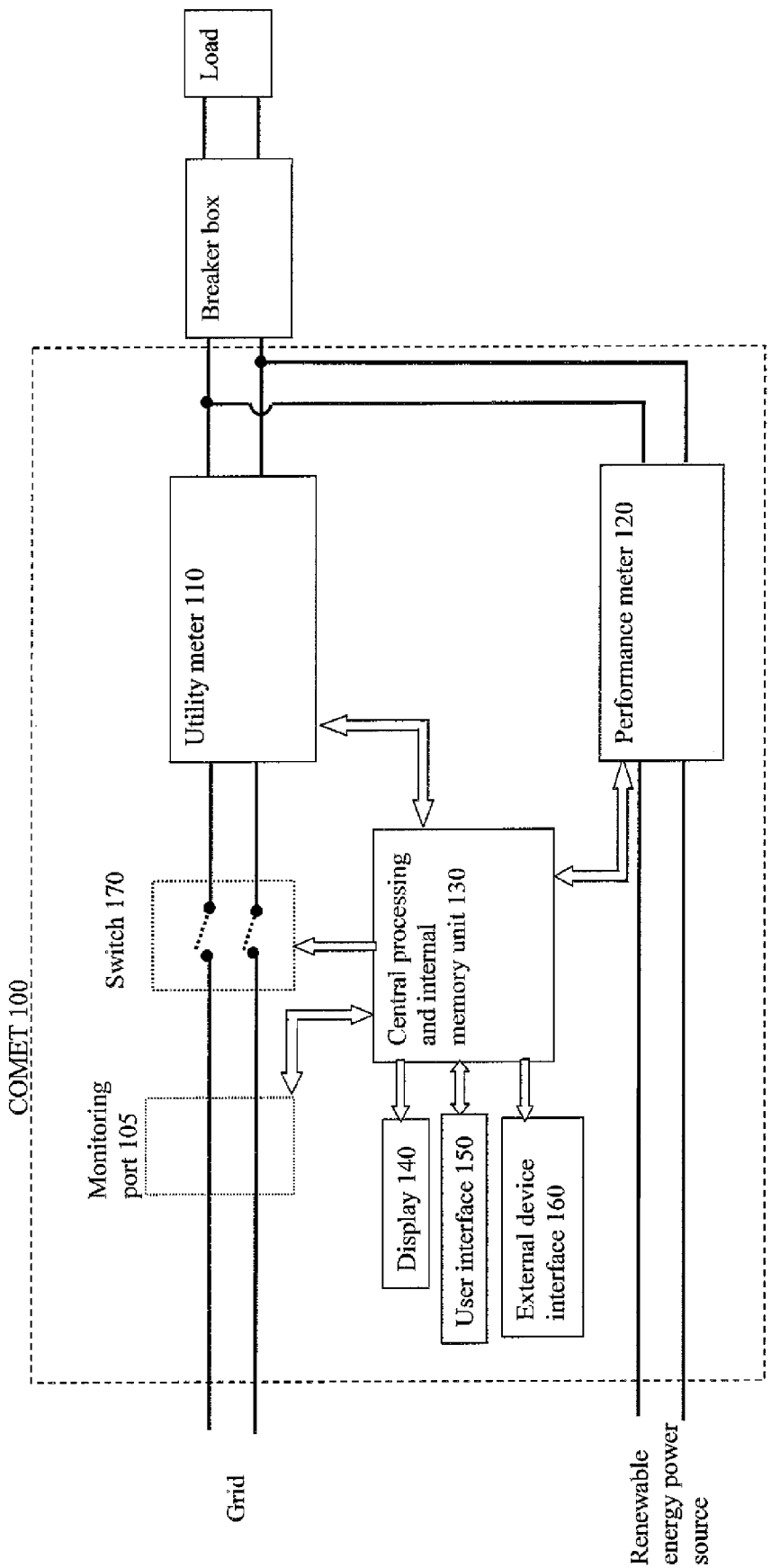

CENTRALIZED OPERATING METER FOR ENERGY TECHNOLOGIES

BACKGROUND OF THE INVENTION

The present invention features an electric meter for residential and commercial applications that will interface the renewable resource power and the requirements of the new energy technologies with the utility interconnection side or "the grid". With the new surge in renewable resource electrical generation, which, due to global warming issues, will be growing exponentially in the future, a new, centralized electrical meter will be required.

In particular, the present invention features a Centralized Operating Meter for Energy Technologies ("COMET"). There are three elements that COMET will centralize into one unit:

(1) Dual Metering.
Current Scenario

Recently, aggressive "Performance Based" financial incentives have been funded for private, corporate and government buildings to encourage the use of New Energy Technologies (Renewable Resources like solar electric, wind turbine electrical generation, etc.). These incentives are base on the actual kilowatt-hours of electricity that the system produces and are paid over a term of years. During this incentive payment period, the sponsoring entity (the entity giving the incentive), requires a "Production Meter" or "Interval Data Meter" be installed, in addition to the electric meter that is installed by the electrical service provider (the municipality or privately held power company). This Production or Interval Data Meter, measures the exact amount of electricity production in time increments (usually around 15 min.) and stores and/or reports them via telephone or broadband connection to a monitoring entity. See FIG. 1.

Proposed Solution

COMET will incorporate both the electrical provider's meter (the meter used by the power company to determine the charges for the month), and the Production or Interval Data meter into one meter that can communicate with both entities and incorporates the required elements that are demanded by each side. They will include, but are not limited to, interval data recording and storage for use by the incentive entity, net meter calculations for use by the power company or provider, and interactive use by the homeowner to monitor his production vs. power used from grid, including time lines. FIG. 2.

(2) System Landing Point
Current Scenario

The accepted area to land the power that is produced by a renewable resource is onto the "bus bar" in the existing electrical panel, on the load side of the existing residential or commercial service panel. The rule of thumb is that an input of 20% over the existing main service panel rating is acceptable. Introducing more that 20% of the existing load would require the replacement of the existing main electrical service panel with a larger size panel, costing somewhere between $1,500 to $5,000. So, if a person or business wants to install renewable resources to generate more than 20% (most are trying to "ZERO" their meter), then they will have to incur this added expense. This will be the case for a huge percentage of customers installing renewable resources, and in California alone, that will be 1,000,000 customers before 2017.

Proposed Solution

COMET will connect at the existing main service panel, meter landing slots, which are on the supply side of the main breaker, and not on the bus bar. These meter landing slots tie directly to the grid and do not involve the bus bar, thereby eliminating the necessity of a main service panel change. See FIG. 3. Both the grid and the renewable power feed power into the breaker box, on the supply side of the main breaker. If the renewable source is making more power than the house can use, then the power goes to the grid, spinning the meter backwards.

(3) Maintain Power
Current Scenario

Currently, if the customer has a renewable energy system, and there is a loss of power on the grid, the renewable energy system is shut down not allowing use of the system by the customer. Imagine how frustrating it would be to not have power on a sunny day after paying tens of thousands of dollars to install a system.

Proposed Solution

COMET will have a "disconnect switch" and regulator, located inside along with a "brain" that monitors the power from the grid. Upon detection of the disruption of power from the grid, COMET will immediately "open" the switch, disconnecting the electrical system from the grid and allow any generated power from the renewable resource electrical system to continue supplying the building. COMET will continue to monitor for the return of the grid power, at which time, COMET will close the switch and resume a normal net metering mode. A battery capable of lasting 30 days will supply power to the "brain" for any times that the system may not be operating. FIG. 3.

BRIEF DESCRIPTION OF THE DRAWINGS

FIG. 1 shows the current circuit hookups with respect to performance meters.

FIG. 2 shows a flow chart of the COMET.

FIG. 3 shows the inventive circuit hookups of COMET.

DESCRIPTION OF PREFERRED EMBODIMENTS

FIG. 2 shows a flow chart of the COMET operation. To use COMET 100, one first connects the device to the circuit as shown in FIG. 3. (removing the existing glass meter and installing the COMET into the breaker panel meter slots). After turning on COMET 100, the user can use the user interface 150 to set time interval for measurement of the renewable energy generation. System production information will be displayed at display panel 140. In some embodiments, as shown in FIG. 3, the performance meter 120 and the utility meter 110 are connected to a central processing and internal memory unit 130 to work in net metering mode. It means that the net energy consumption or generation will be calculated based on the difference between the power drawn from the grid and the power generated by the renewable energy source. The default operation mode for COMET 100 is the normal mode, in which the electricity grid is providing power for the load. In some embodiments, the default operation mode for COMET 100 is the normal mode, in which the electricity grid is providing power for the load. In the normal operation mode, performance meter 120 and utility meter 110 are connected to work in net metering mode. At the same time, central processing unit 130 will continuously monitor the power level of the utility grid via monitoring port 105.

In some embodiments, via the monitoring port 105, the central processing unit 130 will continuously monitor the power level of the utility grid. Once the central processing unit 130 detects a power drop at the monitoring port 105, indicating a power blackout, the central processing unit 130 will switch to the blackout operation mode by sending a signal to the switch 170 to disconnect the grid from the rest of the circuit. Simultaneously, the renewable energy source will replace the grid as the power provider to the load. Upon the detection of power recovery at the monitoring port 105, indicating the resume of power supply from the electricity grid, the central processing unit will reset COMET 100 back to normal operation mode by toggling switch 170 to reconnect the grid to the circuit. In some embodiments, once the central processing unit 130 detects a power drop at the monitoring port 105, indicating a power blackout, the central processing unit will switch to the blackout operation mode. The central processing unit 130 will send a signal to the relay box 170 to disconnect the grid from the rest of the circuit. Upon the detection of power recovery at the monitoring port 105, indicating the resume of power supply from the electricity grid, the central processing unit will reset COMET 100 back to normal operation mode.

The performance meter 120 will constantly measure power generated by the renewable energy power source at time interval set by the user, no matter whether COMET 100 is operating in normal or blackout mode. These measurements are sent to the central processing unit 130 and stored in the internal memory as a data file. The net energy consumption or generation between the grid and the renewable energy source will also be registered by the central processing unit 130 and stored in the same data file or a separate data file. The user can later retrieve these data files by connecting COMET 100 to any external computation device through interface port 160. Or the data files can be transmitted to other devices through a wired or wireless connection.

The present invention may be assembled with currently known electrical equipments as known to one of ordinary skill. For example, various components disclosed in U.S. Pat. No. 7,167,804 and No. 6,661,772 may be adapted for use in the present invention. The disclosures of U.S. Pat. No. 7,167,804 and U.S. Pat. No. 6,661,772 are incorporated in their entirety herein by reference.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An electrical system comprising a centralized operating meter for energy technologies (COMET) which comprises a switch, wherein upon detection of a disruption of power from a grid the COMET immediately opens the switch to disconnect the electrical system from a grid and allow any generated power from a renewable resource electrical system to continue supplying the electricity; wherein COMET connects to the existing main service panel on the supply side of the main breaker and not on the bus bar; wherein COMET ties directly to the grid and does not involve the bus bar, thereby eliminating the necessity of a main service panel change.

\* \* \* \* \*